United States Patent
Lee

(10) Patent No.: US 8,471,554 B2
(45) Date of Patent: Jun. 25, 2013

(54) ENCODER MODULE WITH AN ALIGNMENT SYSTEM

(75) Inventor: Sze Kuang Lee, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 347 days.

(21) Appl. No.: 13/012,416

(22) Filed: Jan. 24, 2011

(65) Prior Publication Data

US 2012/0187942 A1    Jul. 26, 2012

(51) Int. Cl.
*G01B 7/30*    (2006.01)

(52) U.S. Cl.
USPC .............. 324/207.25; 324/207.2; 250/231.13; 250/231.18

(58) Field of Classification Search
USPC ................... 324/207.2, 207.25; 250/231.13, 250/231.18
See application file for complete search history.

(56) References Cited

U.S. PATENT DOCUMENTS

| | | | | |
|---|---|---|---|---|
| 5,708,496 A | * | 1/1998 | Barnett et al. | 356/28 |
| 5,859,425 A | | 1/1999 | Mleinek et al. | |
| 7,205,530 B2 | | 4/2007 | Jones | |
| 7,601,948 B1 | | 10/2009 | Setbacken et al. | |
| 7,637,019 B2 | | 12/2009 | Brandl | |
| 2006/0255251 A1 | | 11/2006 | Jones | |

* cited by examiner

*Primary Examiner* — Jay Patidar

(57) ABSTRACT

An encoder module with an alignment system with an encoder device, a housing and a movable hub is presented. The encoder module may be integrated with an alignment system to facilitate a built-alignment feature for aligning an encoder device disposed within the encoder module. The encoder module may include a hub that may be movably arranged in the housing and rotatable about a central axis of rotation. The hub may be slidingly moved between a first position configured to set the encoder module to engage in a centering mode and a second position configured to set the encoder module to engage in a rotational mode. The encoder module may be configured to be slidingly disposed on a motor whereby a sleeve of the hub is configured to mate with a shaft of the motor by means of slide fitting.

20 Claims, 7 Drawing Sheets

Section A-A

ENCODER MODULE WITH AN ALIGNMENT SYSTEM

BACKGROUND

Encoders have been widely used in many industries for measuring either the linear or rotary movement of objects. A rotary encoder is normally used to covert the angular position or rotary movement of a shaft to an analog or digital signal. A typical rotary encoder may comprise an encoding means and a sensor connected to a rotary device for converting the rotational movement of the rotary device to an electronic signal. For example, a rotary encoder may be connected to the shaft of a motor to convert the angular position of the shaft of a motor to either an analog or a digital signal. Rotary encoders are typically used in applications that require precise rotational measurements, for example, a computer numeric control (CNC) machine, a robotics system, a motorized radar platform, or photographic lenses. Optical and magnetic rotary encoders are two of the most common encoders available in the market. However other types of encoders, such as inductive encoder, capacitive encoder and eddy current encoder are also widely used in many applications for measuring both linear and rotary movements of objects.

Typically, a rotary encoder may include an encoding means that is rotatable with a shaft and a sensor that are mounted in a housing of the encoder. In order to achieve an accurate measurement, the encoding means and the sensor need to be aligned with respect to their relative axial and radial positions. Therefore, in practice, it is necessary to radially align the encoder means with respect to the shaft so that the rotation axis of the shaft is coaxial with the center of the encoding means. In addition, it may also be necessary to align the relative axial position between the encoding means and the sensor by adjusting the gap between the two components. Therefore, in order to achieve an accurate measurement, it is important that the encoder disk and the sensor are aligned accurately during installation. In some instances, the encoders may be pre-aligned by the manufacturer prior to shipment to customers. It is important to include a locking mechanism in such an encoder system, in order to retain the pre-aligned settings made by the manufacturer. The locking mechanism may also prevent the pre-aligned settings from being damaged during shipping and handling or while being installed.

There are many conventional alignment methods that may be implemented in an encoder to adjust the alignment of the encoding means and the sensor, these methods generally involve modification of either the encoder housing or the hub. Other methods may include additional alignment components or features being attached to either the encoder housing or the hub, resulting in a complex system design, complex manufacturing steps, an increase in the number of component parts, and higher encoder cost. Alternatively, an external alignment jig with a gaping device may be utilized to align the encoding means and the sensor. However, such methods may involve a complex installation process for the end user. Additionally, other conventional alignment methods may require the use of an assembly kit with a special tool. However, such methods may require the end user to implement costly and time consuming installation steps, and therefore, may not be acceptable for a compact modular encoder system.

Accordingly, it would be desirable to provide an encoder module having a simple and effective alignment system that can be implemented by an end user easily and inexpensively, while maintaining high encoder reliability and robustness.

BRIEF DESCRIPTION OF THE DRAWINGS

Throughout the description and figures, similar reference numbers may be used to identify similar elements.

DETAILED DESCRIPTION

Encoders are typically used to covert a rotational movement or an angular position of a shaft to an analog or a digital signal. In general, encoders may be implemented based on a variety of technologies, such as optical or magnetic. For example, an optically based encoder may include a light source that emits light onto a photodiode through the slits of a rotatable glass disc with a coded pattern thereon. On the other hand, a magnetic encoder may have a magnet or magnetized material on a rotatable disk coupled with a magnet sensor. While both optical and magnetic technologies may be implemented on the encoder module of the present invention, for clarity and simplification, a magnetic encoder will be used throughout to represent the encoder module in the description of the embodiments. Although certain components or elements are illustrated in conjunction with a magnetic encoder module, the use of the inventive features, particularly the alignment system for providing the centering and rotational modes described herein are not limited to a magnetic encoder. The alignment system of the present invention may also be applicable to an optical encoder, as well as other types of encoders.

Figure 1:
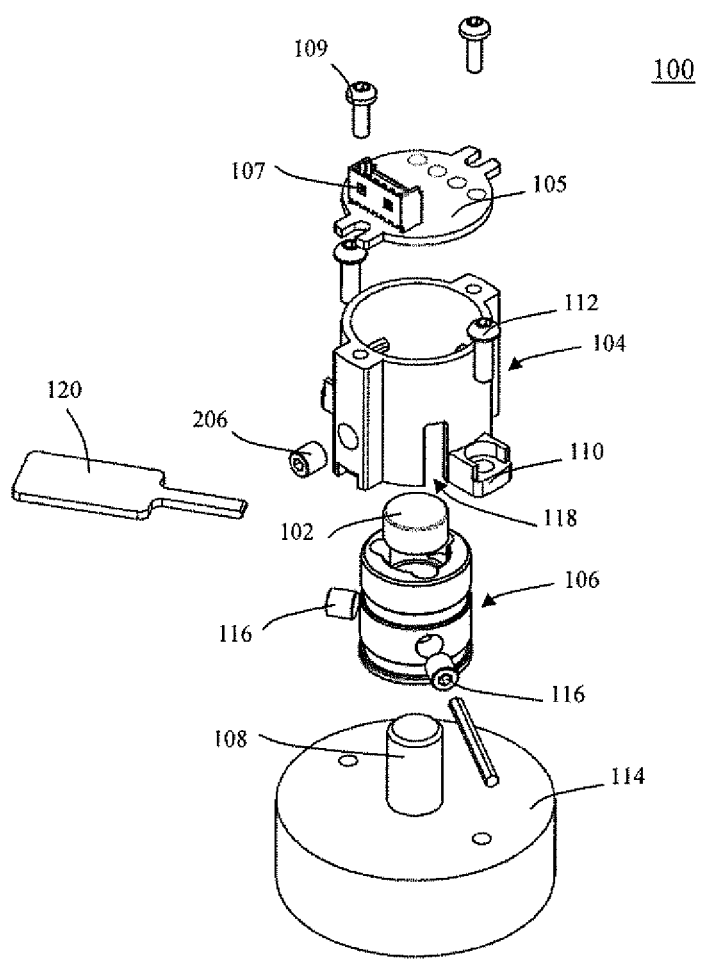
FIG. 1 illustrates a top, perspective view of a partially completed encoder module.
Figure 2:
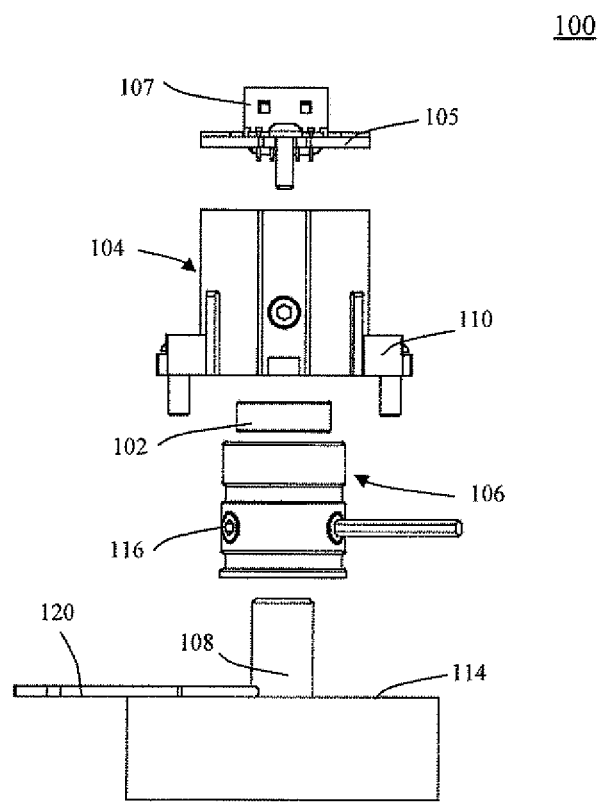
FIG. 2 illustrates a front view a partially completed encoder module.

FIG. 1 illustrates a top, perspective view of an encoder module 100, while FIG. 2 illustrates a front view of the same encoder module 100. Referring now to FIGS. 1 and 2, in one embodiment, the encoder module 100 may include an encoding means 102, a housing 104, a printed circuit board (hereinafter PCB) 105, and a hub 106. As a magnetic encoder will be used as a representative type of the encoder module 100 in the following embodiments, for simplicity, the encoding means 102 will be referred to hereinafter as a magnet 102 and carry the same "102" numbering. The housing 104 may further comprise two or more brackets 110 that are coupled with a fastening means 112, such as screws, rivets, bolts, or other known fastening means for securing the encoder module 100 on a base 114 of a motor (not shown). The housing 104 may also include a housing screw 206 that will be described below with reference to FIG. 3. The housing 104 may further comprise a plurality of openings 118 to accommodate the insertion of the gaping device 120, which will be discussed herein below with respect to FIG. 4B. The PCB 105 may include an output plug adapter 107 and may be mounted on top of the housing 104 by means of one or more fastening means 109, such as one or more screws, bolts, rivets, or other known fastening or attachment means. The hub 106 may include one or more hub screws 116, wherein the hub 106 and the shaft 108 may be secured together using one or more or the hub screws 116, which will be described more fully with respect to FIGS. 3, 4A, and 4B.

The encoder module 100 may be integrated with an alignment system for aligning an encoder device 402 (shown in FIG. 4B) disposed therein. The encoder device 402 (shown in FIG. 4B) may comprise an encoder means 102 and a sensor 404. The alignment system may be facilitated by a combination of components from both the hub 106 and the housing 104, fixedly integrated to enable the encoder module 100 to engage in either a centering mode or a rotational mode. In one embodiment, the alignment system may be configured to set the encoder module 100 to engage in either a centering mode or a rotational mode. It should be noted that the implementation of the alignment system is not limited to a magnetic encoder as illustrated in FIG. 1. The alignment system may be integrated into other types of encoders.

Figure 3:
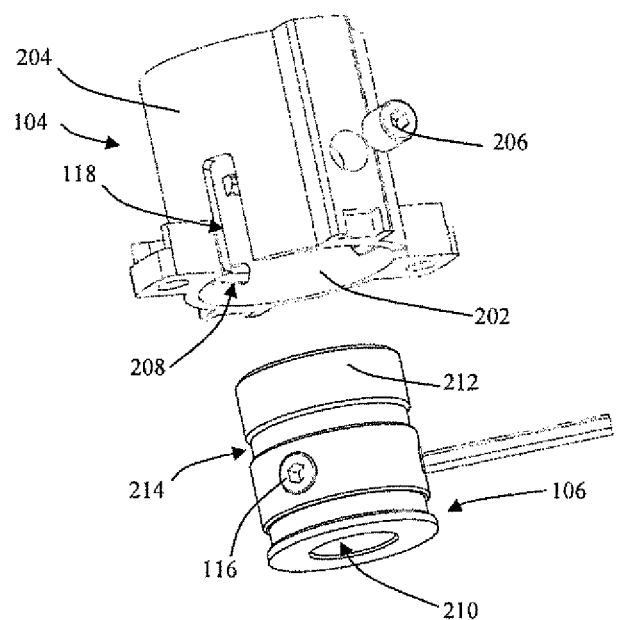
FIG. 3 illustrates a rear, perspective view of a partially completed housing and a hub of an encoder module.
Figure 5:
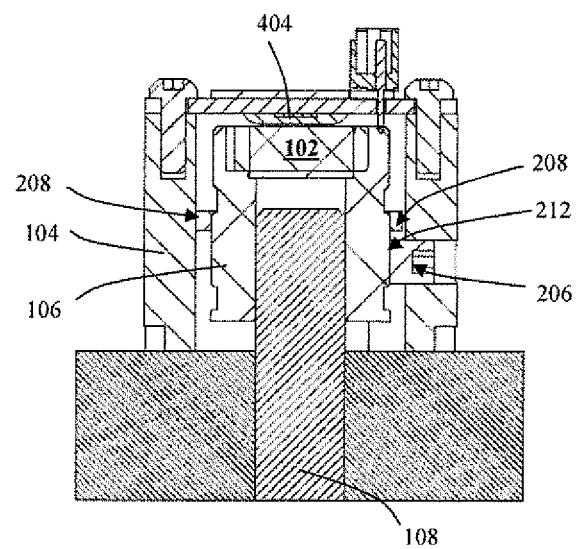
FIG. 5 illustrates a schematic view of an encoder module in centering mode.

The encoder module 100 is configured to engage in a centering mode when the hub 106 is slide fitted into the housing 104 and remains at the first position within the housing 104. Referring to FIG. 1, FIG. 3 and FIG. 5, in one embodiment, the encoder module 100 is configured to engage in a centering mode when the hub 106 is at the first position within the housing 104. The hub 106 is at the first position within the housing when the rib 208 of the housing 104 is biased against the flange structure 212 of the hub 106, thus substantially securing the hub 106 against the housing 104 and retaining the two components in a concentric relationship with respect to one another. Consequently, the magnet 102 and the sensor 404 that is attached to the hub 106 and housing 104, respectively, are also concentric when the encoder module 100 is set to the centering mode. In this respect; the centering mode may be adapted to align the center of the sensor 404 with respect to the rotational axis of the magnet 102 without the use of any centering alignment jig.

Figure 6:
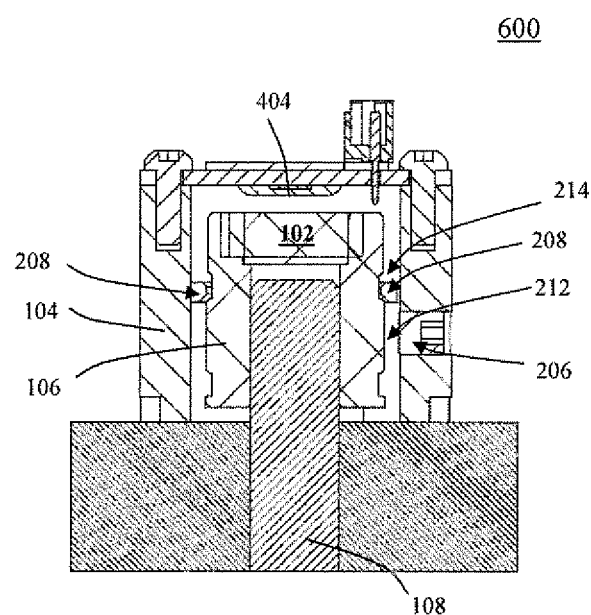
FIG. 6 illustrates a schematic view of an encoder module in rotational mode.

The hub 106 is not rotatable when the encoder module 100 is engaged in the centering mode, because the rib 208 of the housing 104 is biased against the flange structure 212 of the hub 106, thus preventing the hub 106 from moving. However, the hub 106 is rotatable when the encoder module 100 is engaged in the rotational mode. Referring now to FIG. 1, FIG. 3 and FIG. 6, the encoder module 100 is engaged in a rotational mode when the hub 106 is at the second position within the housing 104. The hub 106 is set to the second position within the housing when the hub 106 is slidingly offset from the first position, sliding down towards the base 114 of the motor, so that the circumferential groove 214 of the hub 106 coincides with the rib 208 of the housing 104. As the rib 208 is no longer urging against the flange structure 212 of the hub 106, therefore the hub may rotate freely about a center axis within the housing 104. Consequently, the magnet 102 that is attached to the hub 106 will also rotate about the same axis of rotation with the rotatable shaft 108 when the encoder module 100 is engaged in the rotational mode.

In one embodiment, the centering mode may be adapted for centering to align the encoder module 100 during manufacturing. For example, during manufacturing, a hub 106 having a magnet 102 attached thereon may be slide fitted onto a rotatable shaft 108 first and a housing 104 having a sensor 404 may be slide fitted onto the hub 106 subsequently. When the hub 106 is at the first position within the housing 104, the rib 208 of the housing 104 is biased against the flange structure 212 of the hub 106, thus the housing 104 and the hub 106 are substantially secured and concentric with respect to one another. Therefore, the center of the magnet 102 and the sensor 404 may be aligned when an encoder module 100 is engaged in the centering mode. In addition, in order to avoid the alignment set by the factory from being displaced during delivery or installation, a housing screw 206 may be deployed to lock the hub 106 against the housing 104.

In one embodiment, once the encoder module 100 has been aligned by the manufacturer, there is no need to re-align the encoder module 100 again during installation by the user. Therefore, during installation, the user only needs to slide the pre-aligned encoder module 100 onto the shaft 108 of a motor and mount the encoder module 100 on the base 114 of a motor without having to re-align the center of encoding device 402 again. Once the encoder module 100 is being mounted on the base 114 of the motor, the housing screw 206 may be removed hence allowing the hub 106 to slidingly offset so that the circumferential groove 214 of the hub 106 coincides with the rib 208. In this manner, the hub 106 is allowed to rotate within the housing 104. At this point, the encoder module 100 is configured to engage in rotational mode whereby the hub 106 is set to remain at the second position within the housing 104 and is allowed to rotate about the same axis of rotation as the rotatable shaft 108.

Figure 4A:
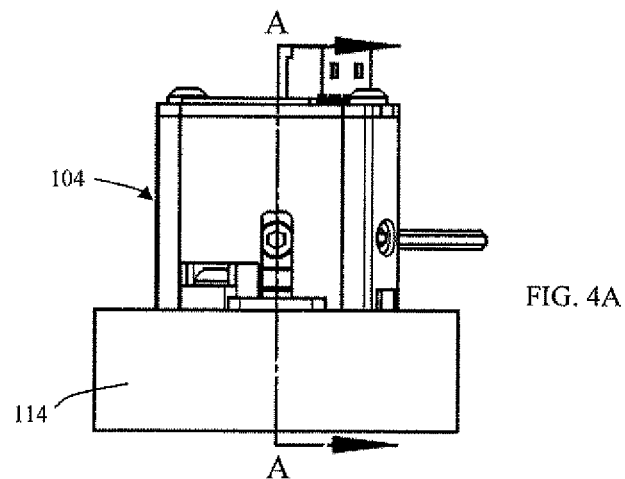
FIG. 4A illustrates a front view of an assembled encoder module.
Figure 4B:
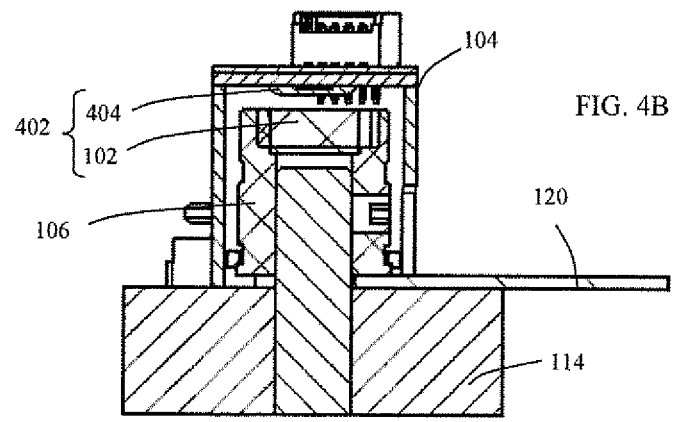
FIG. 4B illustrates a cross-sectional view of an assembled encoder module taken along section line A-A.

In one embodiment, as illustrated in both FIG. 1 and FIG. 4B, the encoder module 100 may include an encoding device 402 (shown in FIG. 4B) that may comprise a magnet 102 and a sensor 404 coupled to a shaft 108 of a motor and configured to measure the absolute or relative rotational movement of the shaft 108. The magnet 102 may be disposed on the hub 106 and may rotate about the same rotational axis with hub 106, wherein the hub 106 may be connected to the shaft 108 of the motor (not shown). The magnet 102 may be coupled with a sensor 404 (shown in FIG. 4B) configured to measure the rotational movement of the shaft 108. For example, when the hub 106 rotates, a magnetic field may be generated by the magnet 102, in response to the rotational movement of the hub 106 on which the magnet 102 is disposed. Accordingly, the generated magnetic field may be detected by the sensor 404, and subsequently produce an electronic signal corresponding to the rotational movement of the shaft 108. In one embodiment, the sensor 404 may be a Hall-Effect magnetic sensor configured to detect the presence of the magnetic field generated by the magnet 102 corresponding to the rotational movement of the hub 106. The magnetic sensor 404 may be mounted on the PCB 105 that is attached to the housing 104. The magnetic sensor 404 may be further coupled with an output plug adapter 107 configured to receive a data cable (not shown) to transfer the electronic signals generated by the magnetic sensor 404 to another device, such as a computer control system (not shown).

In one embodiment, as illustrated in both FIG. 1 and FIG. 3, the encoder module 100 comprises a housing 104 configured to receive the hub 106 and to mount the encoder module 100 onto the base 114 of a motor via brackets 110. As shown in FIG. 3, housing 104 may include an inner surface 202, an outer surface 204, a housing screw 206 and a rib 208 that protrudes from the inner surface 202 of the housing 104. The housing screw 206 is configured to be releasibly fixed to the housing 104. When the housing screw 206 is urged against the hub 106 (as shown in FIG. 5), it may lock the hub 106 against the opposite side of the inner surface 202 of the housing 104, thus preventing the hub 106 from moving with respect to the housing 104. In another embodiment, the housing screw 206 may prevent the center alignment that has been set by the manufacturer from being displaced during shipping and handling or installation. For example, the housing screw 206 may be utilized to lock the housing 104 and the hub 106 together once the centering alignment of the encoder module 100 has been set or aligned during manufacturing. Accordingly, the end user may install the encoder module 100 directly onto a motor (not shown) without re-adjusting the center alignment before, during or after installation. This may eliminate the need to use a centering alignment jig for carrying out the center alignment process, by the user, thus simplifying the installation process for the user.

The housing 104 may further comprise a plurality of openings 118 (shown in FIGS. 1-3) to accommodate the insertion of the gaping device 120. As illustrated in FIG. 4B, the gaping device 120 and the plurality of openings 118 are configured to enable setting the gap of the magnet 102 with respect to the sensor 404. In one embodiment, the gaping device 120 may be removably placed in an opening 118 between the base 114 of the motor and the hub 104. The gaping device 120 may then be utilized to define a gap which determines the relative axial position between the magnet 102 and the sensor 404. The housing 104 may further comprise a pair of brackets 110, which are coupled with a fastening means 112, such as screws, rivets, bolts, or other known fastening means for securing the encoder module 100 to the base 114 of the motor (not shown).

The encoder module 100 may include a hub 106 that is movably arranged in the housing 104 and rotatable about an axis of rotation. As illustrated in FIG. 3, the hub 106 may include a sleeve 210, a flange structure 212, a circumferential groove 214 and at least one hub screw 116. In one embodiment, as shown in FIG. 4B, a cross-sectional view of a stacked up encoder module 100, the sleeve 210 is configured to receive a shaft 108 of a motor whereby the hub 106 may be slidingly fitted onto the shaft 108 of the motor with a tight tolerance. Accordingly, the hub 106 is configured to establish an intimate contact with the shaft 108. In this regard, both the hub 106 and the shaft 108 may be aligned axially and share the same axis of rotation. Consequently, the magnet 102 that is disposed on the hub 106 may also rotate under the same rotational axis. The hub 106 may be made of a metal element that can be formed to include a sleeve 210 that is configured to slidingly fit the external diameter of the shaft 108 of a motor on which the encoder module may be implemented. The hub 106 and the shaft 108 may be further secured together by using a hub screw 116, wherein the hub screw 116 may be configured to urge against the shaft 108 and maintain the alignment between the magnet 102 and the sensor 404 once both components have been aligned.

FIG. 4A and FIG. 4B illustrate a front view and a cross-section view of an assembled encoder module, respectively. As previously described, the hub 106 may be slidingly fixed between a first position and a second position within the housing 104, interchangeably. FIG. 5 illustrates a schematic view of an encoder module engages a centering mode in which the hub 106 is being set under the first position inside the housing 104. Whereas FIG. 6 shows a schematic view of an encoder module during a rotational mode in which the hub 106 is being set under the second position inside the housing 104

FIG. 5 illustrates a schematic view of an encoder module 500 engaged in a centering mode. In one embodiment, when the encoder module 500 is configured to engage in a centering mode, the hub 106 is set under the first position inside the housing 104. The hub 106 is at the first position within the housing when the rib 208 of the housing 104 is biased against the flange structure 212 of the hub 106 to retain the two components in concentric with respect to one another. Consequently, the magnet 102 and the sensor 404 that is attached to the hub 106 and housing 104, respectively, are also in concentric when the encoder module 100 is set to the centering mode. In one embodiment, the centering mode may be adapted to align the center of the sensor 404 with respect to the rotational axis of the magnet 102 without the use of any centering alignment jig.

Additionally, in order to prevent the center alignment set by the factory from being displaced during delivery or installation, a housing screw 206 may be deployed to lock the hub 106 against the housing 104. In one embodiment, once the encoder module 500 has been aligned, a housing screw 206 may be used to urge against the flange structure 212 of the hub 106 so that both components may be locked together to maintain this alignment. This locking mechanism not only provides a useful function for maintaining the predetermined alignment sets by the factory, it also improves the overall robustness of the encoder module 500 against any potential misalignment that could be induced during shipping or installation.

Once the pre-aligned encoder module has been mounted onto the base 114 of a motor (not shown), the housing screw 206 may be removed to allow the hub 106 to slidingly offset so that the circumferential groove 214 of the hub 106 coincides with the rib 208. At this point, the encoder module 100 is configured to engage in the rotational mode whereby the hub 106 is allowed to move to the second position and is rotatable within the housing. In one embodiment, a gaping device may be utilized to set a gap between the hub and the base of the motor. The gap also defines the relative axial position between the magnet 102 and the sensor 404 which will be illustrated further in FIG. 7.

In another embodiment, when the encoder module 600 is set to engage in the rotational mode, as shown in FIG. 6, the hub 106 is being set to the second position inside the housing 104. For enabling the rotational mode, the housing screw 206 is to be released away from the hub 106, hence allowing the hub 106 to offset and slide down towards the base 114 of the motor from the first position. When the hub 106 is set to the second position inside the housing 104, the circumferential groove of the hub 106 coincides with the rib 208 of the housing, hence the rib 208 is no longer urging against the flange structure 212 of the hub 106. In this respect, the hub is allowed to rotate freely about a center axis within the housing 104. There may be more than one set of substantially circumferential ribs 208 within the housing 104 and substantially circumferential grooves 214 separated by one or more flanges 212 on the hub 106, corresponding to the one or more sets of ribs 208. More than one set of ribs 208 and corresponding grooves 214 may maintain the rotational alignment along a central axis.

In one embodiment, once the encoder module 600 has been set to the rotational mode and the gap between the magnet 102 and the sensor 404 has been defined, the hub 106 may be secured against the shaft 108 of the motor with a hub screw 116, thereby allowing the hub to rotate freely in housing 104 together with the shaft of the motor. In this regard, the installation is completed as both the magnet 102 and the sensor 404 have been aligned with respect to their relative axial and radial positions.

Figure 7:
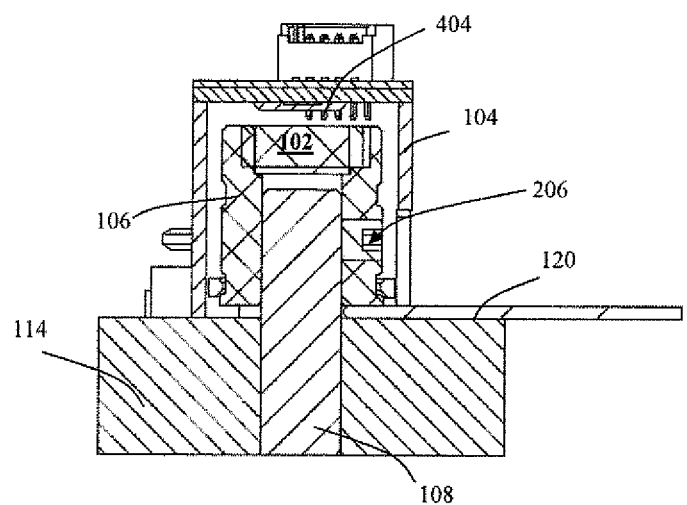
FIG. 7 illustrates a schematic view of an encoder module for setting the relative axial position of the encoding device.

As shown in FIG. 7, the relative axial position between the magnet 102 and the sensor 404 may also be aligned at the same time when the encoder module 700 is engaged in the rotational mode. FIG. 7 illustrates a schematic view of an encoder module for setting the relative axial position of the encoding device. In one embodiment, a gaping member 120 may be used to set a gap between the magnet 102 and the sensor 404 to align the relative axial position between the two. When the hub 106 is being offset and slides toward the base 114 of the motor, a gaping member 120 may be inserted through the opening 118 (shown in FIG. 2) of the housing 104 and set a gap between the magnet 102 and the sensor 404. In one embodiment, the gaping device 120 may be placed between the base 114 of the motor and the hub 106. Thus, the thickness of the gaping device 120 may be configured to define the distance of the gap between the magnet 102 and the sensor 404. Once the encoder module 700 has been aligned and the gap between the magnet 102 and the sensor 404 has been defined, the hub 106 may be secured against the shaft 108 of the motor with a hub screw 116 and allowed to rotate freely in housing 104 when it is driven by the motor. In one embodiment, the hub screw 116 may be configured to urge against the shaft 108 and to hold the alignment between the magnet 102 and the sensor 404 in place once both have been aligned.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An encoder module with an alignment system comprising:
   an encoding device;
   a housing comprising an inner surface, an outer surface, a housing screw and a rib protruding from the inner surface; and
   a hub having an inner hub surface and an outer hub surface, wherein the inner hub surface comprises a sleeve and the outer hub surface comprises a flange structure, a circumferential groove and at least one hub screw, wherein the hub is arranged within the housing and rotatable about an axis of rotation, and wherein the hub is configured to be slidingly moved between a first position and a second position within the housing;
      wherein in the first position, the hub is configured to engage in a centering mode, wherein the housing screw is configured to urge against the hub, and the rib is configured to bias against the flange structure so that the housing and the hub are substantially secured and concentric with one another;
      wherein in the second position, the hub is configured to engage in a rotational mode, wherein the housing screw is being disengaged from the hub and permits the hub to slidingly offset so that the circumferential groove of the hub coincides with the rib and allows the hub to rotate within the housing.

2. The encoder module of claim 1, wherein the encoding device comprises an encoding means and a sensor.

3. The encoder module of claim 2, wherein the encoding means is coupled to the hub and the sensor is coupled to the housing, respectively.

4. The encoder module of claim 2, wherein the encoding device is a magnetic encoder device, wherein the encoding means is a magnet and the sensor is a magnetic sensor.

5. The encoder module of claim 2, wherein the encoding device is an optical encoder device, wherein the encoding means is a coded disc and the sensor is an optical sensor.

6. The encoder module of claim 2, wherein the centering mode is configured to align the center of the sensor with respect to the rotational axis of the encoding means.

7. The encoder module of claim 2, wherein the centering mode is configured to align a relative axial position between the encoding means and the sensor.

8. The encoder module of claim 2, wherein the encoder module is configured to be slidingly disposed on a rotatable shaft, wherein the sleeve of the hub is configured to mate with the shaft by slide fitting.

9. The encoder module of claim 8, wherein the at least one hub screw is configured to urge against the shaft of the motor for maintaining the alignment in between the encoding means and the sensor in aligned position.

10. The encoder module of claim 2, wherein the housing comprises a pair of brackets coupled with a fastening means configured to enable the encoder module to be secured to a base of a motor.

11. The encoder module of claim 10, further comprising a gaping member configured to set the relative axial position between the encoding means and the sensor, the gaping member is removably placed between a base of a motor and the hub to define a gap in between the two.

12. The encoder module of claim 2, wherein the sensor is mounted on a PCB and the PCB is coupled to the housing.

13. The encoder module of claim 1, wherein the rotational mode is configured to allow the hub to rotate within the housing.

14. The encoder module of claim 1, wherein the housing screw is configured to urge against the hub to prevent a set alignment from being displaced.

15. An encoder module comprising:
   a magnetic encoder;
   a housing comprising an inner surface, an outer surface, a housing screw and a rib protruding from the inner surface;
   a hub comprising a sleeve, a flange structure, a circumferential groove and at least one hub screw, the hub is arranged in the housing and rotatable about an axis of rotation, the hub is slidingly movable between a first position and a second position;
      wherein in the first position, the hub is configured to engage in a centering mode, wherein the housing screw is configured to urge against the hub and the rib is configured to bias against the flange structure, so that the housing and the hub are substantially secured and concentric relative to one another;
      wherein in the second position, the hub is configured to engage in a rotational mode, wherein the housing screw is disengaged from the hub and permits the hub to slidingly offset so that the circumferential groove of the hub coincides with the rib and permits the hub to rotate about a central axis within the housing.

16. The encoder module of claim 15, wherein the magnetic encoder comprises a magnet and a magnetic sensor, wherein the magnet is coupled to the hub, and the magnetic sensor is coupled to the housing, respectively.

17. The encoder module of claim 16, wherein the centering mode is configured to align the center of the magnetic sensor with respect to the rotational axis of the magnet and a relative axial position between the magnetic sensor and the magnet, and wherein the rotational mode is configured to allow the hub to rotate within the housing, respectively.

18. The encoder module of claim 17, further comprising a gaping member configured to set the relative axial position between the magnet and the magnetic sensor, the gaping member is configured to be removably placed between a base of a motor and the hub to define a gap between the two.

19. The encoder module of claim 18, wherein the hub screw is configured to urge against a shaft of the motor in order to maintain an alignment between the encoding means and the sensor.

20. The encoder module of claim 15, wherein the housing screw is configured to urge against the hub to prevent a set alignment from being displaced.

* * * * *